Dec. 26, 1939.  A. STUBBS ET AL  2,185,043
ELECTRIC DRIVE SYSTEM
Filed Nov. 26, 1937  2 Sheets-Sheet 1
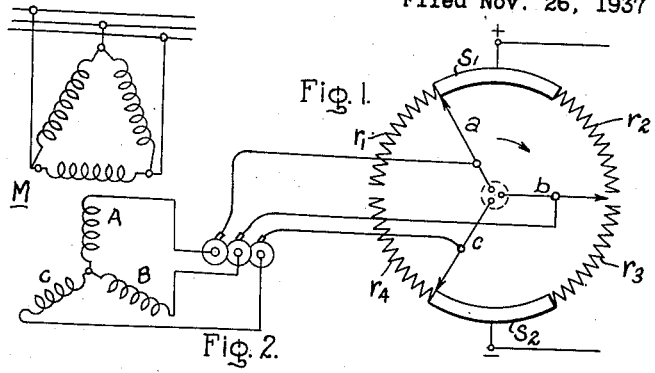
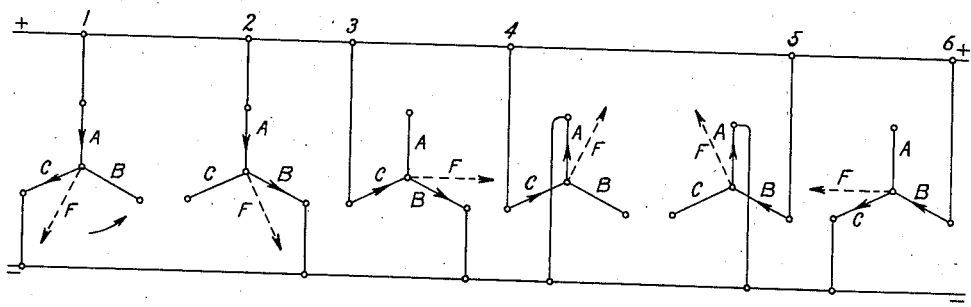
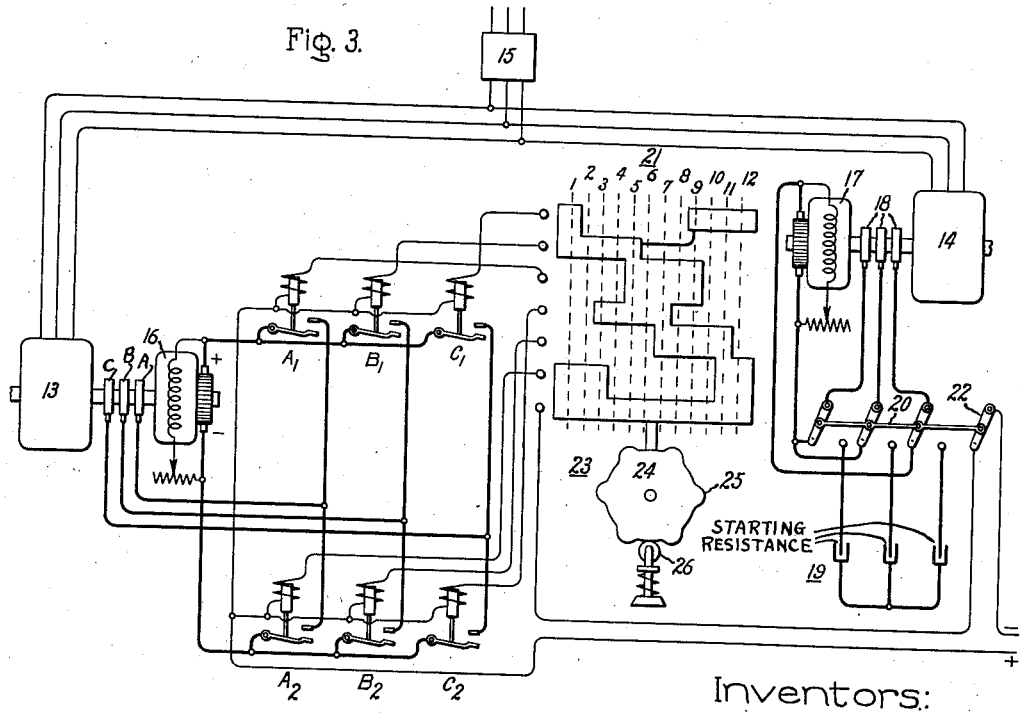
Inventors:
Albert Stubbs,
Robert Townend,
by Harry E. Dunham
Their Attorney.

Patented Dec. 26, 1939

2,185,043

UNITED STATES PATENT OFFICE 2,185,043

ELECTRIC DRIVE SYSTEM

Albert Stubbs, Knutsford, and Robert Townend, Chorlton-cum-Hardy, Manchester, England, assignors to General Electric Company, a corporation of New York Application November 26, 1937, Serial No. 176,444
In Great Britain December 7, 1936

5 Claims. (Cl. 172—293)

This invention relates to electrical control arrangements for effecting fine speed adjustments or relative angular or phase displacements between relatively rotating members.

According to the invention fine speed adjustments or relative angular or phase adjustments in a synchronous electric motor having a plurality of rotor field windings are effected by variously exciting the latter so that the resultant field due to said rotor windings is caused to rotate as desired relatively to the rotor. Such relative rotation of the rotor resultant field and stator rotating field causes the rotor to advance or retard with respect to the normal synchronous speed, the resultant field falling, at the end of an adjustment, into its normal phase relationship with the stator rotating field. Such relative advancing or retarding of the rotor may be effected continuously or in steps by any desired amount and, within limits, at any desired rate.

The invention is notably but not exclusively applicable in pumping systems wherein the reciprocating pistons are arranged in pairs in respective cylinders and the output varied by changing the phase relationship between the shafts which drive the respective pistons of each pair thereof, the speed being constant.

The rotor field windings may be variously excited by connecting them by means of switches in different combinations to the source of direct current such as an exciter on the shaft of the synchronous motor, rheostatic control being employed if smooth adjustment is required.

To enable the invention to be clearly understood, it will now be described by way of example with reference to the accompanying drawings in which Fig. 1 shows diagrammatically one control means for carrying out the invention applied to a synchronous motor having a polyphase rotor, and Fig. 2 is a series of vector diagrams indicating how the relative phase displacement is obtained.

Fig. 3 is an electrical diagram of a complete installation comprising two synchronous motors one of which is subject to phase adjustment by means of a plurality of contactors actuated by a drum controller.

Figure 4:
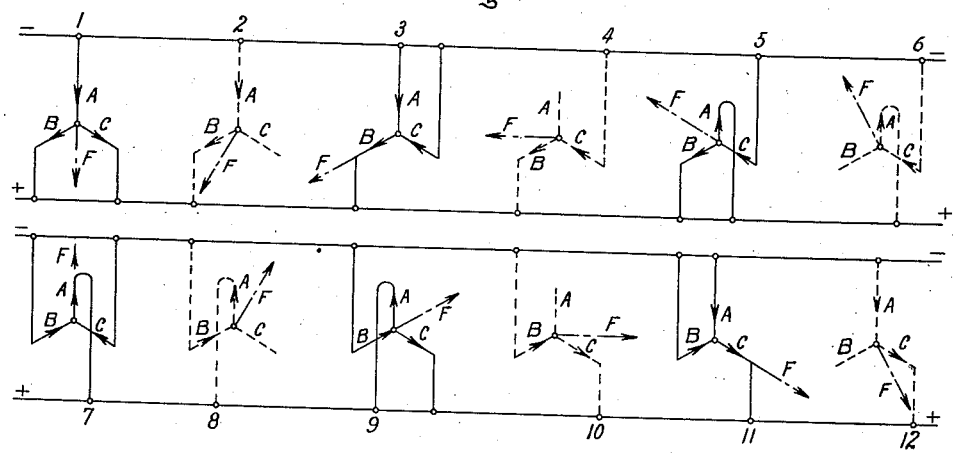
Fig. 4 is a series of vector diagrams indicating the relative phase displacements obtained by the control means illustrated in Fig. 3.

Referring first to Figs. 1 and 2 of the accompanying drawings, it is assumed that the synchronous motor M has a three-phase rotor winding indicated by A, B, C brought out to slip rings the brushes on which are connected to the three arms $a$, $b$, $c$ respectively of the rheostatic type controller. This controller comprises as an example a pair of arcuate contact segments $S_1$ and $S_2$, these being respectively connected to the source (not shown) of direct current supply and indicated in Fig. 1 by the signs (+) and (—). Connected to the two ends of the arcuate segment $S_1$ are resistances $r_1$ and $r_2$ arranged in arcuate form whilst similar resistances $r_3$ and $r_4$ are connected to the ends of the other segment $S_2$. The ends of the resistances are not connected together.

The arms $a$, $b$ and $c$ are disposed at 120° with respect to one another and adapted to be rotated solidly together around the segment and resistance combination.

The operation of the system illustrated by Fig. 1 is as follows, reference being also made to Fig. 2.

In the position of the arms $a$, $b$ and $c$ shown in Fig. 1 it will be readily seen that connections of the rotor windings A, B, C are obtained as shown in diagram 1 of Fig. 2. That is to say, the winding A is connected to the positive terminal and winding C is connected to the negative terminal of the direct current supply source, whilst winding B is connected nowhere, except to the star point of the rotor windings, namely because the arm $b$ of the device shown in Fig. 1 is in the position where it makes no connection with either of the resistances $r_2$ and $r_3$. From diagram 1 it will be seen that the resultant rotor field is as indicated by the dotted arrow F.

If now the arms $a$, $b$ and $c$ are rotated clockwise it will be seen that contact arm $a$ travels along the segment $S_1$, arm $b$ engages and moves along the resistance $r_3$ whilst arm $c$ leaves the segment $S_2$ and moves along the resistance $r_4$. Thus the terminal of the rotor winding B becomes connected through a gradually reduced resistance to the negative terminal of the supply whilst resistance is gradually introduced between the terminal of the rotor winding C and the negative source of direct current supply. In the meantime, since the arm $a$ is moving over the conducting segment $S_1$, the rotor winding A remains directly connected to the positive terminal of the supply. The resultant field F is thus caused to move in the anti-clockwise direction until it reaches the position F', that is wherein the arm $a$ is at the right-hand end of the conducting segment $S_1$ whilst the arm $b$ is in engagement with the right-hand end of the conducting segment S₂, the arm c being between the resistances r₄ and r₁. In this position of the arms a, b and c, the rotor windings A and B are directly connected across the direct current supply source whilst the winding C is disconnected. These conditions are indicated in diagram 2 of Fig. 2.

Thus it will be readily followed how the resultant rotor field F can be caused to rotate continuously and at any desired speed in a counter-clockwise direction by rotation of the arms a, b, c, in a clockwise direction. It will be appreciated that by reason of the resistances the rotation is smooth as distinct from being step-by-step. For many purposes a step-by-step rotation is satisfactory and by employing contactor switches as will now be described with reference to Fig. 3, the use of the resistances shown in Fig. 1 through which resistances the synchronous motor rotor field current must flow, can be avoided.

Referring now to Fig. 3, there is therein shown two synchronous motors 13 and 14, the stators of which are adapted to be connected in parallel to the three-phase supply through the oil switch 15. On the shaft of the motors 13 and 14 are respective exciters 16 and 17 which supply the respective three-phase rotor windings of the synchronous motors.

Referring first to the right-hand motor 14 and its exciter 17, the terminals of the latter are adapted to be connected to the slip rings 18 of the motor 14 either directly as shown or through a suitable resistance starting device 19 such as a liquid starter, by changing the position of the starting switch 20, which is shown in the running position.

On the other hand, the left-hand exciter 16 is adapted to be variously connected to the slip rings A, B and C of the synchronous motor 13 by means of two groups of contactors A2, B2, C2 and A1, B1, and C1 which are adapted to be closed in various combinations by energising their coils appropriately through the drum controller 21, which may be of conventional type, its segment being organised to give the correct sequence of contactor closure of which the first few will now be specified, whilst reference is made also to Fig. 4, the twelve diagrams in which correspond to the twelve numbered positions of the controller 21.

With the controller 21 in position 1, the contactors B1 and C1 and A2 are closed, so that as can be readily traced the rotor phase windings B and C are connected to the positive terminal of the source of direct current (indicated (+) (—) in the figure), whilst the rotor phase winding A is connected to the negative terminal of such supply. It will be observed that the supply is taken through a switch 22 which is interlocked with the starting switch 20 so as to be closed only when the synchronous motor 14 has been started up and synchronised.

With the contactor switches established in position 1 of the controller, the resultant rotor field indicated by the arrow F is as shown in diagram 1 of Fig. 4.

If now the controller is moved to position 2, the contactors B1 and A2 only are closed so that the rotor winding B is connected to the positive of the direct current supply whilst the rotor winding A is connected to the negative thereof. This caused a clockwise rotation of the resultant rotor field F as indicated in diagram 2 of Fig. 4.

When the controller is moved to its third position, the contactors B1, C2 and A2 are closed so that the rotor winding B is connected to the positive of the supply whilst the windings A and C are both connected to the negative of the supply. This gives the conditions indicated by diagram 3 of Fig. 4.

The remainder of the sequence of contactor closure and rotor winding connection combinations can be readily followed from an inspection of Figs. 3 and 4 and it is considered unnecessary to describe them in detail.

It will be noticed, however, that in every position of the controller which has an even number, one winding of the synchronous motor rotor is disconnected (except at the star point) and it is preferable that such conditions be considered as unavoidable transfer or transitional connections. Therefore there is preferably provided an accentuating device indicated at 23 in Fig. 3, beneath the controller 21. The object of this device 23 is to cause the controller to move rapidly from one odd numbered controller position, through the succeeding even numbered position, to the next odd numbered position. The device 23 in an elementary and well known general form comprises a cam disc 24 having six humps 25 and a co-operating spring pressed roller 26 which by its pressure causes the transition movement of the drum 21 to take place rapidly.

It will be understood that any of the control means in accordance with the invention as above described for effecting the relative phase displacement can be brought about automatically by well-known means such as in accordance for example with demands required in the pumps or other device driven by the motor or motors.

We claim:

1. In an electric drive including a pair of synchronous motors arranged to rotate at the same speed but in a predetermined phase relationship, the combination including a three-phase wound rotor for one of said motors, a source of direct current excitation for said rotor, contactors for connecting and disconnecting selective portions of rotor windings to said source of excitation and for either direction of current flow therethrough, a drum controller for sequentially controlling said contactors whereby the resultant field may be shifted throughout 360 electrical degrees with respect to said rotor to vary the phase angle of operation of said one motor with respect to the other motor.

2. In an electric drive for a pair of cooperating elements, the combination including a pair of synchronous motors for driving said elements adapted to be rotated at the same speed and in a predetermined variable phase relationship, one of said motors having a rotor provided with three equally distributed Y-connected windings, a source of direct current excitation for said windings, means operable independently of said motors for selectively connecting any predetermined pair of said windings in series across said excitation source, and means operable independently of said motors for connecting the third winding in parallel with either of said pair of windings.

3. In an electric drive for a pair of cooperating elements, the combination including a pair of synchronous motors for driving said elements adapted to be rotated at substantially identical speeds but in a predetermined phase relationship, one of said motors having a rotor provided with three equally distributed star-connected windings, a source of direct current excitation for said windings, manually operable means for selectively connecting any pair of said windings to said excitation source and for either direction of current flow therethrough, and means for optionally connecting the third winding in parallel with either of said pair of windings.

4. In an electric drive for a pair of cooperating elements, the combination including a pair of synchronous motors for driving said elements adapted to be operated at substantially identical speeds and in a predetermined phase relationship, one of said motors having a rotor provided with at least three phase windings spaced an equal number of electrical degrees apart, a source of direct current excitation for said windings, means operable independently of said motors for selectively connecting any pair of said windings in series across said excitation source, and means for optionally connecting another of said plurality of windings in parallel with either of said pair of windings without altering the previous connections to said pair of windings.

5. In an electric drive for a pair of cooperating elements, the combination including a pair of synchronous motors for driving said elements adapted to be operated at substantially identical speeds and in a predetermined phase relationship, one of said motors having a rotor provided with three star-connected windings spaced an equal number of electrical degrees apart, a source of direct current excitation for said windings, a controller independent of said motors having certain contacts for causing the energization of any predetermined pair of said windings, other contacts for reversing the polarity of said pair of windings and other contacts for independently connecting and disconnecting the third winding in parallel with either of said pair of windings whereby the resultant rotor field may be selectively shifted relative to the rotor in increments of 30 electrical degrees throughout a range of 360 electrical degrees.

ALBERT STUBBS.
ROBERT TOWNEND.